United States Patent
Gessenhardt et al.

(10) Patent No.: US 11,118,521 B2
(45) Date of Patent: Sep. 14, 2021

(54) METHOD FOR OPERATING AN INTERNAL COMBUSTION ENGINE, AND INTERNAL COMBUSTION ENGINE

(71) Applicant: VOLKSWAGEN AKTIENGESELLSCHAFT, Wolfsburg (DE)

(72) Inventors: Christopher Gessenhardt, Weferlingen (DE); Henrik Hoffmeyer, Hannover (DE); Nico Schreeck, Wasbüttel (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 170 days.

(21) Appl. No.: 16/305,360

(22) PCT Filed: May 22, 2017

(86) PCT No.: PCT/EP2017/062211
§ 371 (c)(1),
(2) Date: Nov. 28, 2018

(87) PCT Pub. No.: WO2017/211574
PCT Pub. Date: Dec. 14, 2017

(65) Prior Publication Data
US 2020/0325838 A1    Oct. 15, 2020

(30) Foreign Application Priority Data
Jun. 7, 2016 (DE) .................. 10 2016 209 957.4

(51) Int. Cl.
*F02D 7/00* (2006.01)
*F02D 41/00* (2006.01)
(Continued)

(52) U.S. Cl.
CPC ...... *F02D 41/0087* (2013.01); *F01L 13/0036* (2013.01); *F01L 2001/0537* (2013.01);
(Continued)

(58) Field of Classification Search
CPC ..... F02D 13/06; F02D 17/023; F02D 41/0087
(Continued)

(56) References Cited

U.S. PATENT DOCUMENTS

| 5,481,461 A | 1/1996 | Miyamoto et al. |
| 6,332,445 B1 | 12/2001 | Voss et al. |

(Continued)

FOREIGN PATENT DOCUMENTS

| CN | 102465757 A | 5/2012 |
| CN | 105317568 A | 2/2016 |

(Continued)

OTHER PUBLICATIONS

International Search Report of PCT Application No. PCT/EP2017/062211, dated Aug. 11, 2017.
(Continued)

*Primary Examiner* — John Kwon
(74) *Attorney, Agent, or Firm* — Pearl Cohen Zedek Latzer Baratz LLP (57) ABSTRACT

The invention relates to a method for operating an internal combustion engine, which has an internal combustion motor, which forms at least two combustion chambers, which are bounded by cylinders formed in a cylinder housing and by pistons guided up and down cyclically in said cylinders and in which thermodynamic cycles can be performed during operation of the internal combustion engine, wherein then a gas exchange in the combustion chambers is controlled by means of at least one intake valve (28) and one exhaust valve in the case of each combustion chamber,
(Continued)

which valves are actuated by means of cams, and wherein a first operating state is provided, in which the thermodynamic cycles are performed both in a first combustion chamber and in a second combustion chamber and a second operating state is provided, in which the thermodynamic cycles are performed in the first combustion chamber and the thermodynamic cycles are not performed in the second combustion chamber, is characterized in that, in order to switch from the first operating state to the second operating state, a switch is made from the use of a first intake cam to the use of a second intake cam for the actuation of the intake valve associated with the first combustion chamber. Such a method makes it possible to realize a switchover from full operation to partial operation in manner that is as torque-neutral as possible in that the torque component that ceases because of the deactivation of the cylinder or cylinders provided therefor is compensated by the one or more cylinders that continue to actively operate, at least also in that, in the event of the switchover, the delivery ratio, i.e. the ratio of the mass of fresh gas actually contained in the cylinder after the conclusion of a charge cycle to the theoretical maximum possible mass, is increased for said cylinders and, in particular, is set as high as possible.

15 Claims, 5 Drawing Sheets

(51) Int. Cl.
    *F01L 13/00*     (2006.01)
    *F01L 1/053*     (2006.01)
    *F02D 13/06*     (2006.01)

(52) U.S. Cl.
    CPC ......... *F01L 2013/001* (2013.01); *F02D 13/06* (2013.01); *F02D 2041/0012* (2013.01)

(58) Field of Classification Search
    USPC .............................................. 123/481, 198 F
    See application file for complete search history.

(56) References Cited

U.S. PATENT DOCUMENTS

| | | | |
|---|---|---|---|
| 2003/0172900 A1 | 9/2003 | Boyer et al. | |
| 2004/0103864 A1* | 6/2004 | Carpenter | F02M 1/16 |
| | | | 123/73 C |
| 2005/0205049 A1* | 9/2005 | Lewis | F02D 13/0234 |
| | | | 123/198 DB |
| 2005/0279323 A1* | 12/2005 | Lewis | F02D 13/0253 |
| | | | 123/321 |
| 2008/0072862 A1* | 3/2008 | Turner | F02D 9/02 |
| | | | 123/184.42 |
| 2009/0007866 A1 | 1/2009 | Nakamura | |
| 2012/0118274 A1 | 5/2012 | Keating | |
| 2013/0269207 A1 | 10/2013 | Grunewald | |
| 2014/0014066 A1 | 1/2014 | Yacoub | |
| 2014/0150742 A1 | 6/2014 | Knouchi | |
| 2015/0013628 A1 | 1/2015 | Eppinger et al. | |
| 2015/0152756 A1 | 6/2015 | Nakamura | |
| 2015/0152796 A1 | 6/2015 | Zhang | |
| 2015/0345410 A1* | 12/2015 | Wirth | F02P 5/045 |
| | | | 123/559.2 |
| 2016/0032845 A1 | 2/2016 | Boyer et al. | |
| 2016/0032846 A1 | 2/2016 | Boyer et al. | |
| 2016/0102616 A1 | 4/2016 | McConville et al. | |
| 2016/0102620 A1 | 4/2016 | Ervin et al. | |
| 2016/0215705 A1 | 7/2016 | Haizaki et al. | |
| 2020/0040828 A1* | 2/2020 | Gessenhardt | F02B 29/08 |

FOREIGN PATENT DOCUMENTS

| | | |
|---|---|---|
| CN | 105317572 A | 2/2016 |
| CN | 105508062 A | 4/2016 |
| DE | 103 06 794 B4 | 5/2004 |
| DE | 10 2011 053 333 A1 | 3/2013 |
| DE | 10 2011 086 344 A1 | 5/2013 |
| DE | 10 2011 086 622 A1 | 5/2013 |
| DE | 10 2012 004 419 A1 | 9/2013 |
| DE | 10 2012 007 275 A1 | 10/2013 |
| DE | 10 2012 017275 A1 | 3/2014 |
| DE | 10 2013 223 112 A1 | 6/2014 |
| DE | 10 2013 223 646 A1 | 5/2015 |
| DE | 10 2015 112 196 A1 | 2/2016 |
| DE | 10 2015 116 976 A1 | 4/2016 |
| DE | 11 2015 000165 T5 | 6/2016 |
| EP | 0 596 127 A1 | 5/1994 |
| EP | 0 980 965 A2 | 2/2000 |
| EP | 1 992 809 A2 | 11/2008 |
| EP | 1992809 A3 | 1/2009 |
| JP | H08326548 A | 12/1996 |
| JP | 2008-513683 A | 5/2008 |
| JP | 2009030584 A | 2/2009 |
| JP | 2015105627 A | 6/2015 |
| JP | 2016-050511 | 4/2016 |
| WO | WO-2014/033054 A1 | 3/2014 |

OTHER PUBLICATIONS

Search report for German Patent Application No. 10 2016 209 954.7, dated Dec. 14, 2016.

* cited by examiner

METHOD FOR OPERATING AN INTERNAL COMBUSTION ENGINE, AND INTERNAL COMBUSTION ENGINE

CROSS-REFERENCE TO RELATED APPLICATIONS

This application is a National Phase Application of PCT International Application No. PCT/EP2017/062211, International Filing Date May 22, 2017, claiming priority of German Patent Application No. 10 2016 209 957.4, filed Jun. 7, 2016, which is hereby incorporated by reference.

FIELD OF THE INVENTION

The invention relates to a method for operating a combustion machine comprising a reciprocating internal combustion engine that can be operated in a partial mode of operation.

BACKGROUND OF THE INVENTION

Multi-cylinder reciprocating internal combustion engines are known that can be temporarily operated in a so-called partial mode of operation in which some of the cylinders are deactivated so that no thermodynamic cycles are carried out in them. Rather, the deactivated cylinders are carried along by the cylinders that are still active. This is done with the objective of increasing the efficiency of the operation of the combustion machines since the deactivation of some of the cylinders while essentially retaining a constant drive power causes the cylinders that are still active to operate at a considerably higher load, which is associated with a higher specific efficiency of the thermodynamic cycles carried out in these cylinders. In order for the increase in efficiency that can be achieved for the active cylinders to be reduced only to the smallest extent possible by the fact that the deactivated cylinders are being carried along, as a rule, it is provided that the gas-exchange valves that are associated with the deactivated cylinders are kept closed during the partial mode of operation, as a result of which the gas present inside the combustion chambers formed by these cylinders is cyclically compressed and expanded, but not discharged. In this manner, it is possible to prevent power losses caused by the compression of gases that would subsequently be discharged via opened outlet valves.

In order to achieve the best possible drive comfort in a motor vehicle powered by such a combustion machine, the switchover between the operating states (full mode of operation and partial mode of operation) should be as torque-neutral as possible so that the switchover can be implemented without any jerking of the vehicle. For this purpose, the load, which decreases during the switchover and at which the cylinders that are to be deactivated are being operated, has to be compensated for in an optimally coordinated manner by increasing the load for the operation of the cylinders that are still to be actively operated.

German patent application DE 10 2011 086 344 A1 discloses a combustion machine having an internal combustion engine with two cylinder banks in which one of the cylinder banks can be deactivated in order to achieve a partial mode of operation. In this context, it is provided for the cylinders of the cylinder bank that is to be deactivated to be deactivated one at a time in order to achieve a switchover that is as torque-neutral as possible from the full mode of operation during which both cylinder banks are in the activated state to the partial mode of operation.

German patent application 10 2012 017 275 A1 also describes a reciprocating internal combustion engine having several cylinders, some of which can be individually deactivated within the scope of a partial mode of operation. In order to be able to achieve a switchover that is as torque-neutral as possible from a full mode of operation to a partial mode of operation, the provision is made to briefly activate an actuatable, especially electric-motor powered, compressor for the switchover during a throttling of the cylinders to be deactivated that takes place over the course of several cycles, so as to increase the filling of the cylinders that are still to be actively operated.

SUMMARY OF THE INVENTION

The invention was based on the objective of achieving the most torque-neutral switchover possible from a full mode of operation to a partial mode of operation in a combustion machine.

This objective is achieved by means of a method according to embodiments of the invention. Embodiments of the invention include a combustion machine that is suitable for carrying out such a method is. Advantageous embodiments of the method according to the invention and preferred configurations of the combustion machine according to the invention are disclosed below.

The invention is based on the notion of achieving the most torque-neutral switchover possible from a full mode of operation to a partial mode of operation in a combustion machine having a multi-cylinder internal combustion engine, in that the torque portion that is lost due to the deactivation of the cylinder or cylinders as provided for this purpose is at least also compensated for by the cylinder or cylinders that is/are still to be actively operated in that, during the switchover, the volumetric efficiency that is to say, the ratio of the mass of fresh gas actually contained in the cylinder to the theoretically maximum possible mass after completion of a gas exchange is increased for these cylinders and, in particular, is set at the maximum to the greatest extent possible. As a result, the amount of fuel in the combustion chambers of the cylinders that are still being actively operated and thus the drive torque they are generating can be increased, irrespective of a raising of the intake pipe pressure. The particularly advantageous aspect of an increase in the volumetric efficiency is that this can be achieved relatively quickly especially in comparison to a raising of the pressure in the intake pipe (particularly when a relatively inexpensive exhaust-gas turbocharger is being employed) by shifting the timing of the inlet valves of the cylinders that are still to be actively operated. In this context, the valve timing can be very quickly shifted by changing the cams that actuate these inlet valves by means of an appropriate switchover device of the type that can especially be provided for the deactivation of the gas-exchange valves of the cylinders that are to be deactivated.

Before this backdrop, a method is being put forward for operating a combustion machine, whereby the combustion machine comprises at least one internal combustion engine that has at least two combustion chambers which are delimited by cylinders formed in a cylinder housing and by pistons that move cyclically up and down therein and in which thermodynamic cycles can be carried out during operation of the combustion machine, whereby then a gas exchange in the combustion chambers is regulated by means of at least an inlet valve and an outlet valve that are actuated by means of cams, and whereby a first operating state is provided in which the thermodynamic cycles are being carried out in the first of the combustion chambers as well as in the second of the combustion chambers (full mode of operation), and a second operating state is provided in which the thermodynamic cycles are being carried out in the first combustion chamber and the thermodynamic cycles are not being carried out in the second combustion chamber (partial mode of operation) in that at least the feed of fuel into the second combustion chamber is suppressed and/or the ignition of fuel is prevented, and moreover, the inlet and outlet valves associated with the second combustion chamber are preferably not actuated and are thus kept closed.

In accordance with the underlying notion of the invention, such a method is characterized in that, in order to switch over from the first operating state to the second operating state, a change is made from using a first inlet cam to using a second inlet cam in order to actuate the inlet valve associated with the first combustion chamber.

A combustion machine according to the invention comprising at least one internal combustion engine that has at least two combustion chambers which are delimited by cylinders formed in a cylinder housing and by pistons that move cyclically up and down therein and in which thermodynamic cycles can be carried out during operation of the combustion machine, whereby a gas exchange in the combustion chambers can be regulated by means of at least an inlet valve and an outlet valve that are actuated by means of cams, and whereby, for the inlet valve associated with a first combustion chamber, two inlet cams are provided whose use can be switched over by means of a switchover device is thus characterized by a control device that is programmed in such a way that it can execute a method according to the invention.

In order to be able to achieve an increase in the volumetric efficiency in an advantageous manner by changing the inlet cams for the inlet valve associated with the first combustion chamber that is also actively used in the second operating state, it should preferably be provided that the volumetric efficiency for this combustion chamber (and preferably also for the second combustion chamber) in the first operating state is not as high as possible in that a relatively early or a relatively late closing of the inlet is provided for the inlet valve(s) associated with this or these combustion chamber (s). Such a procedure can be regularly provided in modern combustion machines and is known as the Miller or Atkinson method. In this manner, during operation of a combustion machine at low to medium loads, a relatively high efficiency can be achieved due to a quite pronounced relief of the relatively small amount of the gas that is contained in the combustion chambers during the stroke. For this reason, it can preferably be provided that at least the inlet valve of the first cylinder is closed when it is actuated by means of the first inlet cam before a BDC of 60° crank angle (CA) or after a BDC of +100° crank angle (CA) (BDC=bottom dead center of the piston motion). Since a switchover from the full mode of operation to the partial mode of operation of the combustion machine is often only possible in a meaningful manner if the combustion machine (during the full mode of operation) had been previously operated essentially stationarily at low to medium loads, then in order to achieve the best possible efficiency during this (full) mode of operation, it is also meaningful to operate this combustion machine in accordance with a Miller method. According to the invention, however, after the switchover to the partial mode of operation, the volumetric efficiency in the first combustion chamber that is still being actively operated should be higher in comparison to the full mode of operation in order to at least partially compensate for the loss of drive power of the combustion chamber. For this purpose, it can especially be provided for the highest possible volumetric efficiency to be achieved, whereby any conceivable limitations that might exist such as, for instance, the avoidance of (engine) knocking, should be taken into consideration. Towards this end, it can be provided within the scope of the invention that at least the inlet valve of the first cylinder is closed during the partial mode of operation of the combustion machine and consequently during actuation by means of the second inlet cam in the range between a BDC of 50° crank angle (CA) and a BDC of +50° crank angle (CA), preferably between a BDC of 20° crank angle (CA) and a BDC of +30° crank angle (CA).

In order to achieve the most advantageous possible partial mode of operation of the combustion machine, in a preferred embodiment of the method according to the invention, it can be provided for a valve overlapping that is to say, a simultaneous opening of the inlet and outlet valves associated with the first combustion chamber to be adapted for a switchover from the first operating state to the second operating state. This can especially be achieved in that at least the closing of the outlet or else the outlet timing are shifted together (that is to say, additionally also the opening of the outlet) for the appertaining outlet valve in the early direction, for example, by a crank angle (CA) between 0° and 20°.

Such a shifting of the outlet timing can be done, for example, by means of a phaser with which the phase angle of the outlet cam(s) if applicable, of a camshaft into which the outlet cam(s) are integrated in their entirety can be rotated relative to a drive wheel that effectuates a rotation of the outlet cam(s). Consequently, a combustion machine according to the invention can have a phaser that serves to change the timing of the outlet valve associated with the first combustion chamber and/or with the second combustion chamber. However, since such phasers normally function relatively slowly, in a preferred embodiment of the method according to the invention, it can be provided that a change is made from using a first outlet cam to using a second outlet cam in order to actuate the outlet valve associated with the first combustion chamber, so as to achieve an appropriate shift of the outlet timing. In this context, it can especially be provided for the second outlet cam to effectuate a relatively early opening of the outlet in comparison to the first outlet cam. For this purpose, a combustion machine according to the invention can comprise at least two outlet cams for the outlet valve associated with the first combustion chamber, whereby their use can be switched over by means of a switchover device.

An increase in the volumetric efficiency that is provided according to the invention in order to switch over from a full mode of operation to a partial mode of operation for the cylinders that are still being actively operated can be fundamentally employed, irrespective of the fact that it might be possible to adjust the pressure in an intake pipe of the combustion machine, as can be done, for instance, by means of turbocharging. Consequently, the combustion machine according to the invention can also fundamentally be a non-turbocharged combustion machine, that is to say, one in which the internal combustion engine is configured as a naturally aspirated engine. Preferably, however, it can be provided that, after the switchover from the first operating state to the second operating state, the pressure in an intake pipe of the combustion machine is raised so that it is possible to compensate for the portion of the drive power that has been lost due to the deactivation of one or more cylinders during the partial mode of operation, which is done not only by increasing the volumetric efficiency for the cylinder(s) that is/are still being actively operated but also by increasing the cylinder filling resulting from a raised pressure in the intake pipe and thus by the possibility of converting a larger amount of fuel.

Consequently, a combustion machine according to the invention can have means to raise the pressure in an intake pipe of the combustion machine. These means can especially be a compressor that is integrated into the fresh gas line of the combustion machine. Particularly preferably, the compressor can be part of an exhaust-gas turbocharger that also has a turbine which is integrated into an exhaust line of the combustion machine and with which the compressor can be powered. Such an exhaust-gas turbocharger can also be fitted with a device to vary the turbine inflow (variable-geometry turbocharger VGT) which can relatively quickly and effectively influence the pressure in the intake pipe of the combustion machine.

The term "intake pipe" refers to the last section of the fresh gas line of the combustion machine where the stream of fresh gas is divided into partial streams that are fed into the individual combustion chambers of the internal combustion engine, for which purpose the intake pipe forms a number of gas-carrying channels that match the number of combustion chambers of the internal combustion engine.

In a familiar manner, a device to vary the turbine inflow (VGT) can comprise a plurality of guide vanes which are arranged in an inlet of a turbine of the exhaust-gas turbocharger and which are configured so as to be individually rotatable, whereby they can be shifted jointly by means of a shifting mechanism. The guide vanes, as a function of their angular positions, constrict the free flow cross section in the inlet of the turbine to a greater or lesser extent, and they also influence the segment of the primary inflow of the turbine rotor and the orientation of this inflow.

Starting from an initial value prescribed for the full mode of operation, the step of influencing the pressure in the intake pipe of the combustion machine before a target value prescribed for the partial mode of operation has been reached usually takes a relatively long time, which especially can also be considerably longer than the time needed for the switchover from the first inlet cam to the second inlet cam for the inlet valve associated with the first combustion chamber. Particularly when and if the step of influencing the pressure in the intake pipe is prescribed, it can therefore also be preferably provided that, after the switchover from the first operating state to the second operating state, especially using a phaser, the timing of the outlet valve associated with the first combustion chamber
- is shifted in the early direction if a closing of the inlet before the BDC had been prescribed for the first operating state, or
- is shifted in the late direction if a closing of the inlet after the BDC had been prescribed for the first operating state.

For this purpose, a combustion machine according to the invention can especially have a phaser to change the timing of the inlet valve associated with the first combustion chamber and/or with the second combustion chamber. This advantageously allows a particularly good torque-neutral switchover from the full mode of operation to the partial mode of operation in that, by means of the inventive increase in the volumetric efficiency for the cylinder(s) that is/are still to be actively operated, the merely relatively slow increase in the effect of raising the pressure in the intake pipe is also compensated for. In this manner, it can particularly be provided that, by means of the switchover from the first inlet cam to the second inlet cam, an increase in the volumetric efficiency is achieved which is greater than that provided for the operation after an initial phase during which the effect of raising the pressure in the intake pipe is not yet completely present. Starting from this initially relatively large increase in the volumetric efficiency, an essentially constant drive torque can be achieved during the initial phase and beyond by appropriately changing the timing of the inlet valve associated with the first combustion chamber, as a result of which the volumetric efficiency is once again reduced a bit more and counter to the rise in the pressure in the intake pipe.

Insofar as the switchover from the first inlet cam to the second inlet cam for the first inlet valve associated with the first combustion chamber is supposed to achieve the greatest possible increase in the volumetric efficiency, this can cause the combustion processes that take place in this combustion chamber within the scope of the thermodynamic cycles to approach the knocking limit or it could cause the knocking limit to be exceeded in the absence of countermeasures. In order to prevent this, in a preferred embodiment of the method according to the invention, it can be provided that, for the switchover from the first operating state to the second operating state, the ignition angle is shifted in the late direction. Preferably, this can occur simultaneously with the switchover of the inlet cams. Such a procedure can especially be implemented in the case of an externally ignited internal combustion engine, especially a gasoline engine.

The subject matter of the invention is also a control device having a storage unit, whereby a computer program is stored in said storage unit and a method according to the invention can be carried out when the program is executed.

The invention also relates to a computer program with a program code to carry out a method according to the invention when the computer program is executed on a computer.

The indefinite articles ("a", "an"), especially in the patent claims and in the description that generally explains the patent claims, are to be understood as such and not as numbers. Therefore, components described in a concrete manner should be understood in such a way that they are present at least once and can also be present several times.

BRIEF DESCRIPTION OF THE DRAWINGS

The present invention will be explained in greater detail below on the basis of an embodiment shown in the drawings. The drawings show the following.

DETAILED DESCRIPTION OF THE INVENTION

Figure 1:
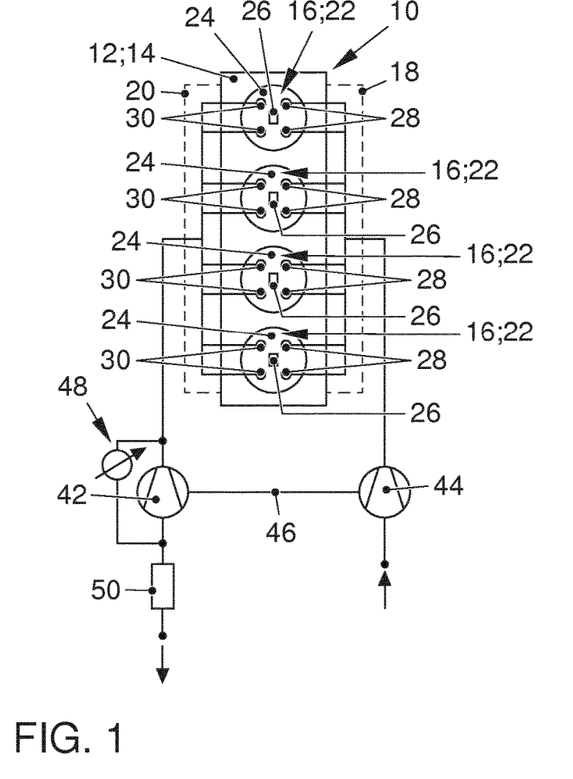
FIG. 1: a combustion machine according to the invention, in a schematic view.

FIG. 1 schematically shows a combustion machine according to the invention. For instance, a motor vehicle (not shown here) can be powered by means of the combustion machine.

Figure 2:
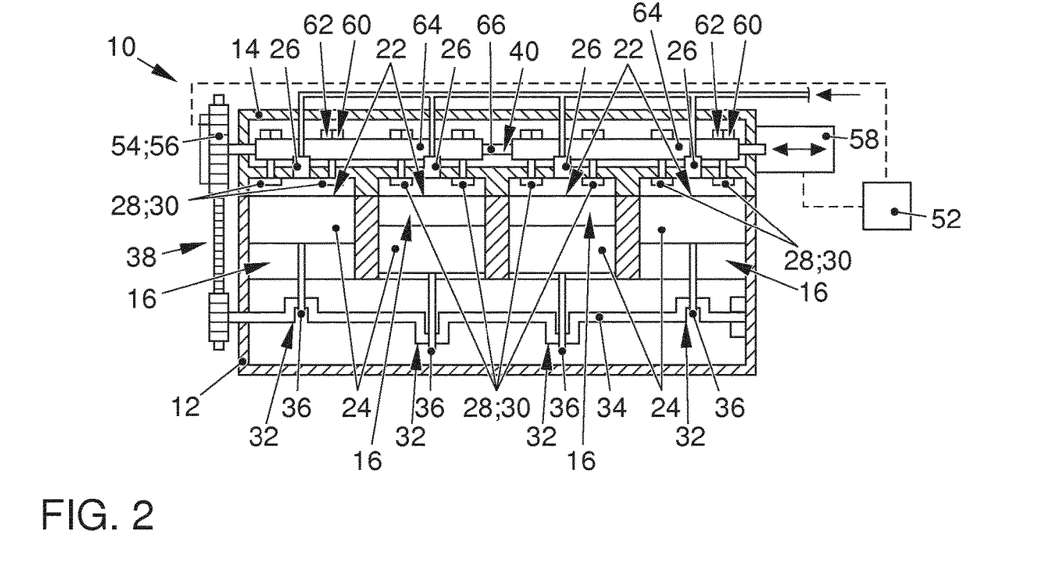
FIG. 2: a schematic longitudinal section of the internal combustion engine of the combustion machine as shown in FIG. 1.

The combustion machine comprises an internal combustion engine 10 that is also shown in greater detail in FIG. 2 and that especially can be operated in accordance with the Otto principle. In an assembly consisting of a cylinder crankcase 12 and a cylinder head 14, the internal combustion engine 10 forms several (here four) cylinders 16. The cylinders 16 are connected on the inlet side to an intake pipe 18 of a fresh gas line and on the outlet side to an exhaust manifold 20 of an exhaust gas line of the combustion machine in such a way as to carry gas. Fresh gas (essentially air) is burned with fuel in a known manner in the combustion chambers 22, which are delimited by the cylinders 16, together with pistons 24 contained therein as well by the cylinder head 14. For this purpose, the fuel can be directly injected into the combustion chambers 22 by means of injectors 26. The exhaust gas generated during the combustion of the fuel-fresh gas mixture is discharged via the exhaust gas line.

The feed of the fresh gas into the combustion chambers 22 and the discharge of the exhaust gas from the combustion chambers 22 is regulated via four gas-exchange valves, namely, two inlet valves 28 and two outlet valves 30 per cylinder 16, said valves being actuated by a valve train (not shown in FIG. 1) of the internal combustion engine 10. The valve train as shown in FIG. 2 comprises a crankshaft 34 that forms a crank journal 32, whereby the crank journals 32 are joined to the pistons 24 via connecting rods 36. As a result, linear movements of the pistons 24 are converted into a rotation of the crankshaft 34, whereby the rotation of the crankshaft 34, in turn, brings about a periodical change in the direction of the linear movements of the pistons 24. Moreover, the rotation of the crankshaft 34 is transmitted via a control gear, for instance, a toothed-belt gear 38, to two camshafts 40, each of which actuates two gas-exchange valves 28, 30 per combustion chamber 22, for example, via a rocker arm or valve rocker (not shown here). One of the camshafts 40 is configured as an inlet camshaft, that is to say, it actuates all of the inlet valves 28, whereas the other one is configured as an outlet camshaft and consequently, it actuates all of the outlet valves 30.

The combustion machine also comprises an exhaust-gas turbocharger. The latter has a turbine 42 integrated into the exhaust gas line as well as a compressor 44 integrated into the fresh gas line. A rotor of the turbine 42 that is made to rotate by the exhaust-gas stream drives a rotor of the compressor 44 by means of a shaft 46. The rotation of the rotor of the compressor 44 brought about in this manner compresses the fresh gas that passes through it. The charge pressure can be limited by means of a wastegate 48 in that, during operation of the internal combustion engine 10 at high rotational speeds and/or loads, part of the exhaust-gas stream bypasses the turbine 42. Moreover, an exhaust-gas after-treatment device 50, for example, in the form of a three-way catalytic converter, is integrated into the exhaust-gas line.

The internal combustion engine 10 also comprises a phaser 54 for the camshafts 40 that is actuated by a control device 52 (engine control). The phaser 54 makes it possible to change or to shift the timing and thus the opening phases of the associated gas-exchange valves 28, 30. Each phaser 54 is integrated in a known manner (see, for instance, German patent application DE 10 2013 223 112 A1) into a gearwheel 56 of the camshafts 40. Accordingly, the phasers 54 of the camshafts 40 can each have an impeller rotor (not shown here) that is non-rotatably connected to the appertaining camshaft 40 and that is arranged inside a stator (not shown here) of the phaser 54 so that it can rotate to a limited extent. On its essentially cylindrical outer surface, the stator forms a toothed contour that serves to engage with teeth of a toothed belt of the toothed-belt gear 38. Between the impeller rotor and the stator of the phaser 54, there can be several pressure chambers which are controlled by a phaser valve (not shown here) and which can be systematically filled with a liquid, especially oil, in order to rotate the impeller rotor inside the stator in a defined manner, as a result of which, with an eye towards the objective of changing the opening phase of the associated gas-exchange valves 28, 30, it is possible to change the phase angle between the camshaft 40 that is connected to each impeller rotor and the stator that is connected to the crankshaft 32 so as to bring about rotation.

The combustion machine also comprises a switchover device 58 by means of which the inlet valves 28 and the outlet valves 30 can be switched over from being actuated by means of a first cam 60 to being actuated by means of a second cam 62. This switchover device 58 can likewise be actuated by the control device 52 and, in FIG. 2, it is only schematically depicted. The function of the switchover device 58 is based on a longitudinal-axial mobility of sleeve-shaped cam carriers 64 (also see FIG. 3), which are non-rotatably arranged on a base shaft 66, by means of a switchover actuator 68 (see FIG. 4), whereby, for each of the inlet valves 28 and outlet valves 30 that can be actuated by said actuator, the cam carriers 64 have two different cams 60, 62 (see FIGS. 3 and 4) which, as a function of the shifting positions of the cam carriers 64, interact alternatingly with the associated inlet valves 28 and outlet valves 30.

Figure 3:
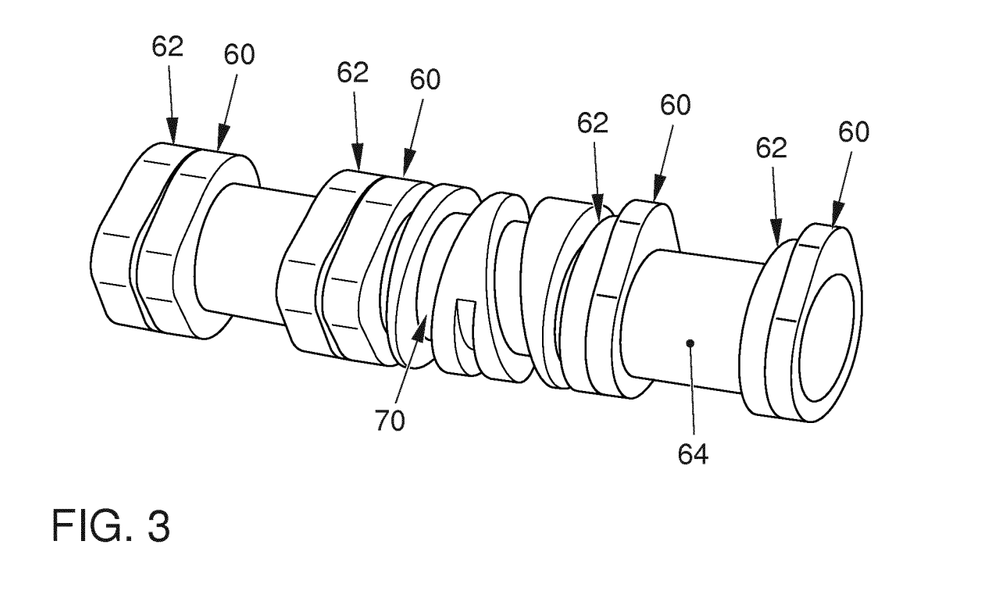
FIG. 3: a cam carrier for an internal combustion engine as shown in FIG. 1.
Figure 4:
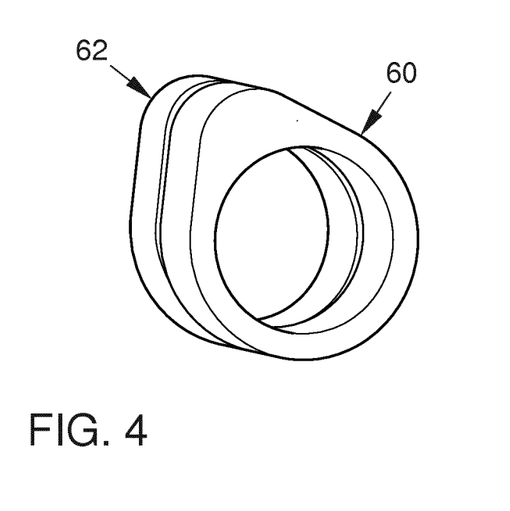
FIG. 4: a cam pair of the cam carrier as shown in FIG. 3.

In the embodiment as shown in FIGS. 2 and 3, each of the cam carriers 40 has a total of four pairs of cams, each of which is associated with a gas-exchange valve 28, 30 of the combustion machine. Therefore, by means of the cams 60, 62 that are formed on such a cam carrier 64, either the inlet valves 28 or the outlet valves 30 are actuated by a total of two adjacent cylinders 16 of an internal combustion engine 10 as shown in FIGS. 1 and 2, in which two inlet valves 28 and two outlet valves 30 are associated with each cylinder 16. Between the two cam pairs associated with the gas-exchange valves 28, 30 of a first cylinder 16 and the two cam pairs associated with the gas-exchange valves 28, 30 of a second cylinder 16, the cam carrier 64 shown in FIG. 3 also forms a shifting gate in the form of a Y-shaped guide groove 70. Owing to the interaction of this guide groove 70 with catches 72 of the associated switchover actuator 68, the cam carrier 64 can be moved axially by the distance x and, as a result, a selected cam 60, 62 of each pair of cams can be operatively connected to the associated gas-exchange valve 28, 30. For this purpose, according to FIG. 5, starting, for instance, from the functional position shown, in which the gas-exchange valves 28, 30 are each operatively connected to the right-hand (first) cam 60 of each pair of cams, the right-hand catch 72 can be extended and the cam carrier 64 can consequently be moved towards the right by the distance x in conjunction with its rotation (upwards in FIG. 5). Owing to the run-out of the Y-shaped guide groove 70 in the middle section in the lower section in FIG. 5 the right-hand catch 72 is thus once again brought back into the retracted position. After such a movement of the cam carrier 64 by the distance x, the left-hand (second) cams 62 of each pair of cams are then operatively connected to the associated gas-exchange valve 28, 30. Such a movement of the cam carrier 64 to the right by the distance x causes the left-hand catch 72 to overlap the left-hand section of the Y-shaped guide groove 70, so that, when this catch 72 is extended, the cam carrier 64 can once again be moved to the left by the distance x.

According to the invention, it is provided that, for purposes of a so-called partial mode of operation of the combustion machine, a partial amount, and especially half of the combustion chambers 22, specifically the two combustion chambers in the middle, can be deactivated in that the feed of fuel to the appertaining injectors 26 is interrupted and the gas-exchange valves 28, 30 associated with them are no longer actuated, that is to say, opened. For this purpose, it is provided that each cam pair that is associated with the gas-exchange valves 28, 30 of such a deactivatable combustion chamber 22 forms a second cam 62 in the form of a so-called zero cam that has no cam elevation and therefore does not cause a gas-exchange valve 28, 30 associated with it to open. In the case of the cam carrier 64 according to FIG. 3, the left-hand cams of the two cam pairs arranged to the right of the guide groove 70 are configured as such zero cams.

When a switchover is made from the full mode of operation of the combustion machine in which all of the cylinders 16 are operated at low to medium loads to such a partial mode of operation, then, within a very short period of time corresponding approximately to one revolution of the crankshaft 32, half of the cylinders 16 are deactivated so that they can no longer contribute to generating drive power by the internal combustion engine 10. On the contrary, since the pistons 24 associated with these cylinders 16 have to be carried along by the cylinders 16 that are still being actively operated, these deactivated cylinders 16 change their function from being power generators to being power consumers.

Since such a switchover from the full mode of operation to the partial mode of operation should regularly take place during a constant operating phase of the combustion machine, it then also follows that the drive power should remain essentially constant before and after the switchover. For this reason, the loss of the deactivated cylinders 16 as power generators has to be compensated for by the cylinders 16 that are still being actively operated. For this purpose, the load at which these cylinders are operated after a switchover has to be increased considerably and, in particular, it has to be approximately doubled. In order for this to happen, a much larger amount of fuel has to be converted within one cycle of the thermodynamic cycles that are carried out by the cylinders 16 that are still being actively operated, and for this purpose, a correspondingly greater amount of fresh gas is needed.

On the one hand, this greater amount of fresh gas should be obtained by raising the pressure in the intake pipe 18 by means of familiar measures of charge-pressure regulation of the exhaust-gas turbocharger. More fresh gas can then be introduced into the combustion chambers 22 through a greater compression of the fresh gas, so that a correspondingly greater amount of fuel can be converted.

Moreover, it is likewise provided that the volumetric efficiency, and thus the ratio of the masses of fresh gas actually present in the cylinders 16 after completion of the charge change, is increased to the theoretically maximum possible masses and, in particular, it is maximized. These two measures in combination yield a marked increase in the amount of fresh gas fed to the cylinders 16 that are still being actively operated within one cycle during the partial mode of operation as compared to the full mode of operation that preceded the switchover.

Figure 6:
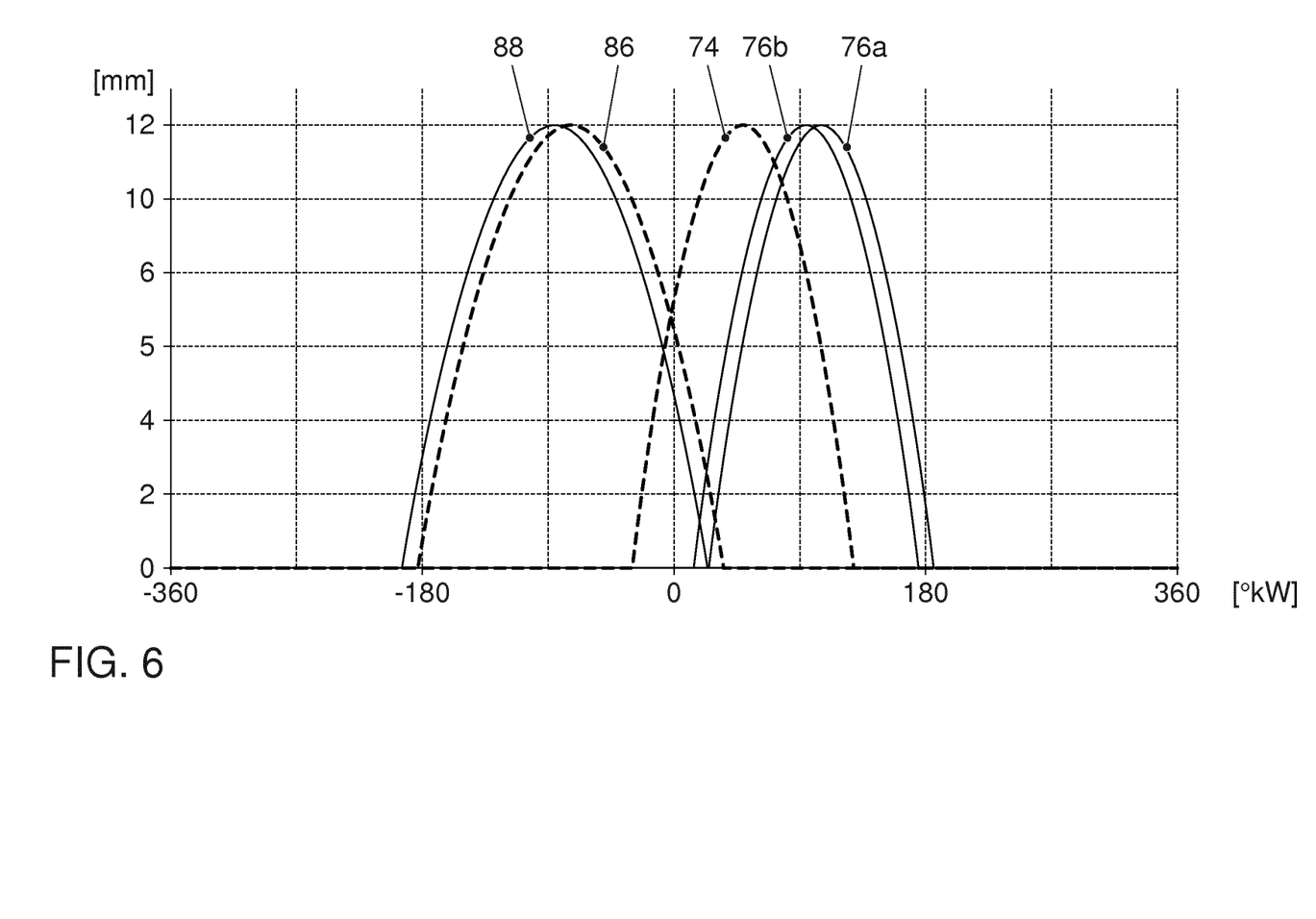
FIG. 6: various stroke curves for the gas-exchange valves of an internal combustion engine as shown in FIG. 2.

The effect of the increase in the volumetric efficiency is also relatively pronounced because it is provided that the combustion machine is operated in a so-called Miller cycle during a full mode of operation that precedes a switchover to the partial mode of operation, whereby in said cycle, it is provided according to the present embodiment that the inlet valves 28 are closed relatively early and thus well before the BDC (for example, approximately 50°), thereby resulting in an incomplete filling of the combustion chambers. This is shown in FIG. 6 on the basis of the stroke curve 74 provided for all of the inlet valves 28 during the full mode of operation of the combustion machine. After a switchover to the partial mode of operation for which purpose not only the cams 60, 62 that are associated with the gas-exchange valves 28, 30 of the cylinders 16 that are to be deactivated (each towards a zero cam) are changed, but also (at least partially) the cams 60, 62 that are associated with the gas-exchange valves 28, 30 of the cylinders 16 that are still to be actively operated are changed the inlet valves 28 of these cylinders 16 that are still to be actively operated no longer close relatively early but rather, with an eye towards maximizing the volumetric efficiency, they close near and concretely speaking a few degrees after the BDC, as can be seen on the basis of the stroke curve 76a depicted in FIG. 6.

Figure 7:
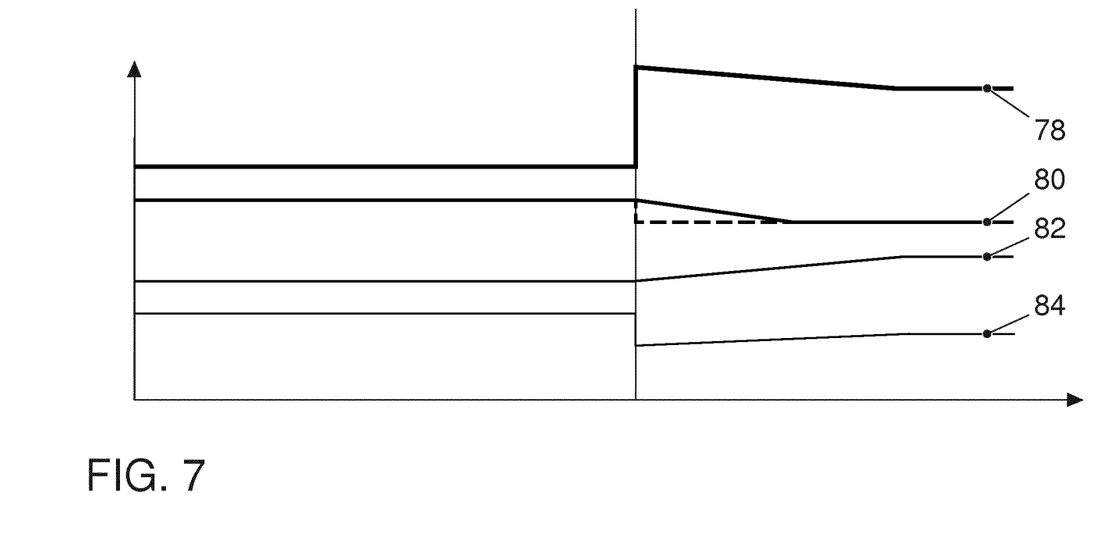
FIG. 7: in a diagram, the quantitative curves of various operating parameters of a combustion machine as shown in FIG. 1 before and after a switchover from a full mode of operation to a partial mode of operation.

FIG. 7 shows a compilation of those measures that are provided according to the invention in order to achieve a switchover of the combustion machine from the full mode of operation to the partial mode of operation in a manner that is as torque-neutral as possible and consequently without a perceptible brief reduction of the drive power generated by the combustion machine.

The diagram according to FIG. 7 qualitatively shows the curve of various operating parameters of the combustion machine, specifically the opening point in time (curve line 78) prescribed for the inlet valves 28 of those cylinders 16 that are also actively operated during the partial mode of operation, the closing point in time (curve line 80) prescribed for the outlet valves 30 of the same cylinders 16, the pressure in the intake pipe (curve line 82) as well as the ignition angle (curve line 84) plotted over the time t (horizontal axis). In this context, the left-hand half of the diagram divided by a vertical line shows the corresponding operating parameters for the full mode of operation of the combustion machine, whereas the right-hand half of the diagram shows the curve of the operating parameters during an initial phase of the partial mode of operation. Therefore, the position of the vertical line corresponds to the switchover point in time or to the switchover procedure that is carried out relatively quickly, namely, within one revolution of the camshafts 40 and that takes effect within one revolution of the crankshaft 34.

Figure 5:
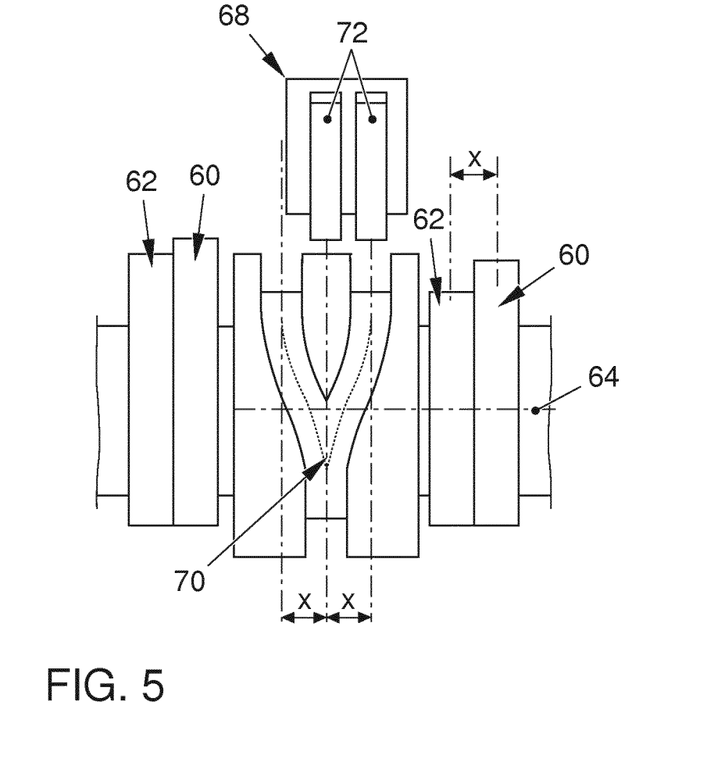
FIG. 5: a section of the cam carrier as shown in FIG. 3 and a switchover actuator in a schematic view.

In the same brief period of time, the increase in the volumetric efficiency also takes effect, which is achieved through the switchover between the two cams (60, 62, see FIG. 5) which are offset in terms of their timing and which serve to actuate the inlet valves 28 of the cylinders 16 that are still to be actively operated, whereas the effect of raising the pressure in the intake pipe 18 only increases relatively slowly up to a prescribed magnitude.

This delayed effect of raising the pressure in the intake pipe 18 is compensated for by the quickly occurring increase in the volumetric efficiency in that a stroke having a curve that is at first prescribed for the maximum possible volumetric efficiency is effectuated by means of the (second) cams 62 provided for this purpose for the inlet valves 28 associated with the cylinders 16 that are also to be actively operated during the partial mode of operation. This stroke curve, however, is once again moved somewhat in the early direction immediately following the switchover by means of the phaser 54 of the combustion machine that is associated with the inlet camshaft 40. This continues to be done until the pressure in the intake pipe 18 has reached the prescribed value (see the stroke curve 76b in FIG. 6).

Since the stroke curve 76a for the inlet valves 28 associated with the cylinders 16 that are still being actively operated during the partial mode of operation said stroke curve 76a being dimensioned in order to attain a maximum volumetric efficiency would lead to a markedly increased tendency to knocking in the absence of countermeasures, according to FIG. 7 (see curve line 84), simultaneously with the switchover, a reduction and thus a shift of the ignition angle in the early direction are prescribed in order to counter such an increase in the knocking tendency. The prescribed reduction of the ignition angle, which is initially relatively strong, is continuously, at times once again partially reversed in the opposite direction as long as the stroke curve 76a, 76b of the inlet valves 28 is shifted in the early direction by means of the phaser 54.

FIG. 7 also shows (see curve line 80) that, at the same time as the switchover from the full mode of operation to the partial mode of operation, the closing of the inlet valves 30 associated with the cylinders 16 that are still being actively operated is shifted in the early direction by means of the phaser 54 associated with the outlet camshaft 40, as a result of which the best possible adaption of the overlapping of the inlet valves 28 and outlet valves 30 can be achieved. In this context, FIG. 6 also shows the corresponding stroke curve 86, as is provided for the outlet valves 30 during the full mode of operation prior to the switchover, as well as the stroke curve 88, as is provided for the outlet valves 30 that are still being activated after the influence exerted by the phaser 54 has been ended during the partial mode of operation.

Since, in this embodiment, the timing of the outlet valves 30 of the cylinders 16 that are still being actively operated during the partial mode of operation is shifted in the early direction by means of the phaser 54, it can be the case that no switchover capability by means of the switchover device 58 is provided for here. Regarding the outlet camshaft 40, the switchover capability for the actuation by means of two cams 60, 62 can be accordingly limited to those outlet valves 30 that are no longer being actuated during a partial mode of operation of the combustion machine. As an alternative, however, two cams 60, 62 can also be provided for the outlet valves 30 that are to be actuated during the partial mode of operation and that have identical cam tracks, so that the switchover for the actuation of the outlet valves 30 associated with them remains without effect. In turn, as an alternative, the shift of the timing of the outlet valves 30 in the early direction can also be achieved by a switchover between two cams 60, 62 having different cam tracks for the outlet valves 30 that are also being actuated during the partial mode of operation, as is shown in FIG. 7 on the basis of the broken curve line 80.

LIST OF REFERENCE NUMERALS

10 combustion machine
12 cylinder crankcase
14 cylinder head
16 cylinder
18 intake pipe
20 exhaust-gas manifold
22 combustion chamber
24 piston
26 injector
28 gas-exchange valve/inlet valve
30 gas-exchange valve/outlet valve
32 crank journal
34 crankshaft
36 connecting rod
38 toothed-belt gear
40 camshaft
42 turbine
44 compressor
46 shaft
48 waste gate
50 exhaust-gas after treatment device
52 control device
54 phase
56 belt wheel
58 switchover device
60 first cam
62 second cam
64 cam carrier
66 base shaft
68 switchover actuator
70 guide groove
72 catch
74 stroke curve of the inlet valves during the full mode of operation
76a stroke curve of the inlet valves actuated during the partial mode of operation, before a phase shift
76b stroke curve of the inlet valves actuated during the partial mode of operation, after a phase shift
78 curve of the opening point in time of the outlet valves actuated during the partial mode of operation
80 curve of the closing point in time of the outlet valves actuated during the partial mode of operation
82 curve of the pressure in the intake pipe
84 curve of the ignition angle
86 stroke curve of the outlet valves during the full mode of operation
88 curve of the outlet valves actuated during the partial mode of operation, after a phase shift

The invention claimed is:

1. A method for operating a combustion machine comprising an internal combustion engine that has at least two combustion chambers which are delimited by cylinders formed in a cylinder housing and by pistons that move cyclically up and down therein and in which thermodynamic cycles can be carried out during operation of the combustion machine, comprising:

regulating a gas exchange in the combustion chambers by means of at least an inlet valve and an outlet valve that are actuated by means of cams, whereby:
in a first operating state, in which the thermodynamic cycles are carried out in a first combustion chamber as well as in a second combustion chamber:
actuating the at least one inlet valve of the first combustion chamber by a first inlet cam, and
actuating the at least one inlet valve of the second combustion chamber by a third inlet cam, and
in a second operating state, in which the thermodynamic cycles are carried out in the first combustion chamber and the thermodynamic cycles are not carried out in the second combustion chamber, switching from actuating the at least one inlet valve of the first combustion chamber by the first inlet cam to actuating the at least one inlet valve of the first combustion chamber by a second inlet cam.

2. The method according to claim 1,
wherein at least the inlet valve associated with the first combustion chamber is closed when it is actuated by means of the first inlet cam before a BDC of 60° crank angle or after a BDC of +100° crank angle, and
wherein at least the inlet valve associated with the first combustion chamber is closed by means of the second inlet cam in the range between a BDC of 50° crank angle and a BDC of +50° crank angle.

3. The method according to claim 1, wherein a valve overlapping of the inlet and outlet valves associated with the first combustion chamber is adapted for a switchover from the first operating state to the second operating state.

4. The method according to claim 3, wherein a change is made from using a first outlet cam to using a second outlet cam in order to actuate the outlet valve associated with the first combustion chamber.

5. The method according to claim 4, wherein the second outlet cam effectuates a relatively early closing of the outlet in comparison to the first outlet cam.

6. The method according to claim 1, further comprising, after switching from the first operating state to the second operating state, raising the pressure in an intake pipe of the combustion machine.

7. The method according to claim 1, further comprising, after switching from the first operating state to the second operating state, shifting the ignition angle for the first combustion chamber in the late direction.

8. The method according to claim 1, wherein the timing of the actuation by the second inlet cam of the at least one inlet valve associated with the first combustion chamber:
is shifted in the early direction if the timing of the first inlet cam causes the at least one inlet valve associated with the first combustion chamber to close before the BDC for the first operating state, or
is shifted in the late direction if the timing of the first inlet cam causes the at least one inlet valve associated with the first combustion chamber to close after the BDC for the first operating state.

9. A combustion machine comprising:
an internal combustion engine that has at least two combustion chambers which are delimited by cylinders formed in a cylinder housing and by pistons that move cyclically back and forth therein and in which thermodynamic cycles can be carried out during operation of the combustion machine,
wherein a first combustion chamber has at least one inlet valve actuated by a first inlet cam during a first operating state, and actuated by a second inlet cam during a second operating state;
wherein a second combustion chamber has at least one inlet valve which is actuated by a third inlet cam during the first operating state, and controlled by a fourth inlet cam during the second operating state, wherein the fourth inlet cam is configured as a zero cam which does not actuate the at least one inlet valve of the second combustion chamber, a switchover device configured to:
switch between the first inlet cam and the second inlet cam, and
switch between the third inlet cam and the fourth inlet cam, and
a control device configured to, when switching over from the first operating state to the second operating state, control the switchover device to switch from valve control by the first inlet cam and the third inlet cam to valve control by the second inlet cam and the fourth inlet cam,
wherein, in the first operating state, thermodynamic cycles are carried out in the first combustion chamber and the second combustion chamber, and, in the second operating state, thermodynamic cycles are carried out in the first combustion chamber but not in the second combustion chamber.

10. The combustion machine according to claim 9, wherein the first combustion chamber or the second combustion chamber has at least one outlet valve, and the at least one outlet valve of the first combustion chamber or the second combustion chamber has at least two associated outlet cams, and the switchover device is configured to switch between the at least two associated outlet cams to shift timing of the at least one outlet valve,
wherein the combustion machine further comprises a phaser to change the timing of the at least one outlet valve.

11. The method according to claim 2, wherein at least the inlet valve associated with the first combustion chamber is closed by means of the second inlet cam in the range between a BDC of −20° crank angle (CA) and a BDC of +30° crank angle (CA).

12. The method according to claim 1, wherein, irrespective of a raising of intake pipe pressure, timing of the second inlet cam increases volumetric efficiency of the first combustion chamber in comparison to timing of the first inlet cam.

13. The combustion machine according to claim 9, wherein, irrespective of a raising of intake pipe pressure, timing of the second inlet cam increases volumetric efficiency of the first combustion chamber in comparison to timing of the first inlet cam.

14. The combustion machine according to claim 9, further comprising a compressor, wherein the control device is further configured to, after switching over from the first operating state to the second operating state, causing the compressor to raise the pressure in an intake pipe of the combustion machine.

15. The combustion machine according to claim 9, wherein:
the second inlet cam is configured to shift timing of the actuation of the at least one inlet valve associated with the first combustion chamber in the early direction if the first inlet cam is configured to close the at least one inlet valve of the first combustion chamber before BDC; and
the second inlet cam is configured to shift timing of the actuation of the at least one inlet valve associated with the first combustion chamber in late direction if the first inlet cam is configured to close the at least one inlet valve of the first combustion chamber after BDC.

* * * * *